US010172033B2

(12) United States Patent
Rune (10) Patent No.: US 10,172,033 B2
(45) Date of Patent: Jan. 1, 2019

(54) OVERLOAD CONTROL IN A COMMUNICATION NETWORK

(71) Applicant: Telefonaktiebolaget L M Ericsson (publ), Stockholm (SE)

(72) Inventor: Johan Rune, Lidingö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/648,502

(22) PCT Filed: Jan. 30, 2013

(86) PCT No.: PCT/SE2013/050076
§ 371 (c)(1),
(2) Date: May 29, 2015

(87) PCT Pub. No.: WO2014/088486
PCT Pub. Date: Jun. 12, 2014

(65) Prior Publication Data
US 2015/0319638 A1    Nov. 5, 2015

(30) Foreign Application Priority Data

Dec. 4, 2012 (WO) ................. PCT/SE2012/051339

(51) Int. Cl.
*H04W 28/02* (2009.01)
*H04W 72/12* (2009.01)
(Continued)

(52) U.S. Cl.
CPC ....... *H04W 28/0289* (2013.01); *H04L 1/0072* (2013.01); *H04W 4/70* (2018.02);
(Continued)

(58) Field of Classification Search
CPC ... H04W 4/005; H04W 72/00; H04W 74/006; H04W 74/0833; H04W 74/002; H04W 28/02; H04W 72/12; H04L 1/0072
See application file for complete search history.

(56) References Cited

U.S. PATENT DOCUMENTS

2009/0201798 A1*  8/2009  Lee ..................... H04W 74/002
                                                              370/216
2009/0238141 A1   9/2009  Damnjanovic et al.
(Continued)

FOREIGN PATENT DOCUMENTS

EP       2 192 798       6/2010
WO    WO 2009/093816    7/2009
WO    WO2014_084766     6/2014

OTHER PUBLICATIONS

European Patent Office Communication pursuant to Article 94(3) EPC, Application No. 13 705 278.3-1854 dated Mar. 22, 2017.
(Continued)

*Primary Examiner* — Lakeram Jangbahadur
(74) *Attorney, Agent, or Firm* — Baker Botts, LLP (57) ABSTRACT

Disclosed are methods as well radio network nodes and user equipments (UE) that are suitable for overload control in a communication network. A radio network node may, upon receiving a random access preamble from an UE, determine whether there exists an overload condition. In response to a determination that an overload condition exists, the radio network node may configure a MAC PDU220 to accompany a E/T/RAPID subheader 212 with a request to extend the time period during which the UE waits for reception of a MAC RAR response.

12 Claims, 7 Drawing Sheets

(51) Int. Cl.
*H04L 1/00* (2006.01)
*H04W 74/00* (2009.01)
*H04W 74/08* (2009.01)
*H04W 4/70* (2018.01)
*H04W 72/00* (2009.01)

(52) U.S. Cl.
CPC ........... *H04W 28/02* (2013.01); *H04W 72/12* (2013.01); *H04W 74/002* (2013.01); *H04W 74/006* (2013.01); *H04W 74/0833* (2013.01); *H04W 72/00* (2013.01)

(56) References Cited

U.S. PATENT DOCUMENTS

| | | | | |
|---|---|---|---|---|
| 2010/0202288 | A1* | 8/2010 | Park | H04W 48/08 370/230 |
| 2010/0238859 | A1 | 9/2010 | Vukovic et al. | |
| 2011/0317777 | A1* | 12/2011 | Huang | H04W 74/004 375/259 |
| 2012/0051297 | A1* | 3/2012 | Lee | H04W 74/006 370/329 |
| 2012/0163169 | A1* | 6/2012 | Yang | H04W 28/0205 370/230 |
| 2012/0300752 | A1* | 11/2012 | Kwon | H04W 56/0005 370/336 |
| 2013/0188612 | A1* | 7/2013 | Dinan | H04W 56/0005 370/336 |
| 2014/0079013 | A1* | 3/2014 | Kim | H04W 28/0215 370/329 |

OTHER PUBLICATIONS

International Search Report for International application No. PCT/SE2013/050076, dated May 13, 2013.
3GPP TSG-RAN WG2 #73bis; Shanghai, China; Title: Random Access Overload Control for MTC (R2-112372), Apr. 11-15, 2011.
3GPP TS 36.321 V10.5.0; 3rd Generation Partnership Project; Technical Specification Group Radio Access Network; Evolved Universal Terrestrial Radio Access (E-UTRA); Medium Access Control (MAC) protocol specification (Release 10), Mar. 2012.
3GPP TS 36.321 V11.0.0, $3^{rd}$ Generation Partnership Project; Technical Specification Group Radio Access Network, Evolved Universal Terrestrial Radio Access (E-UTRA); Medium Access Control (MAC) protocol specification (Release 11), Sep. 2012.
3GPP TS 22.368 V12.1.0, $3^{rd}$ Generation Partnership Project; Technical Specification Group Services and System Aspects; Service requirements for Machine-Type Communications (MTC) Stage 1 (Release 12), Dec. 2012.

* cited by examiner

OVERLOAD CONTROL IN A COMMUNICATION NETWORK

PRIORITY

This nonprovisional application is a U.S. National Stage Filing under 35 U.S.C. § 371 of International Patent Application Serial No. PCT/SE2013/050076, filed Jan. 30, 2013, and entitled "Overload Control In A Communication Network" which claims priority to International Patent Application Serial No. PCT/SE2012/051339 filed Dec. 4, 2012, both of which are hereby incorporated by reference in their entirety.

TECHNICAL FIELD

Embodiments of the present invention presented herein generally relate to communication networks and, more particularly, to overload control in such networks.

BACKGROUND

Detailed descriptions of communication networks and systems can be found in literature, such as in Technical Specifications published by, e.g., the $3^{rd}$ Generation Partnership Project (3GPP). In such systems, user equipments (UE) can, e.g., access mobile services via an access network comprising a Radio Access Network (RAN) and a Core Network (CN). Examples of 3GPP-based communication networks include, for example, 2G GSM/GPRS (Global System for Mobile Communications/General Packet Radio Services), 3G UMTS (Universal Mobile Telecommunications System), and LTE (Long Term Evolution) EPS (Evolved Packet System). Examples of radio access networks (RAN) include GERAN (GSM/EDGE (Enhanced Data rates for GSM Evolution) RAN for 2G GSM/GPRS), UTRAN (Universal Terrestrial RAN for 3G UMTS), and E-UTRAN (Evolved UTRAN for LTE EPS). Examples of packet core networks include GPRS Core (for 2G and 3G) and Evolved Packet Core (for 2G, 3G UTRAN and E-UTRAN).

In communication systems, such as those mentioned above, a potential problem is that a number of UEs and/or other devices may simultaneously require communication network resources. This may induce a congestion or overload of network resources, which may potentially have serious consequences as the communication system may no longer be able to function properly or sufficiently well.

This problem of congestion or overload is becoming increasingly important in particular with the introduction in communication networks of Machine Type Communication (MTC), also sometimes referred to as Machine-to-Machine Communication (M2M), for example as currently specified by standardization bodies such as the 3GPP, see for example 3GPP TS 22.368 V.12.1.0 (2012-12). MTC is a form of data communication which involves one or more MTC devices that do not necessarily involve human interaction. MTC devices are an example of a UE. In other words, MTC devices constitute a subset of the term UE.

With the introduction of MTC in communication systems such as those described hereinabove, the potentially large number of MTC devices and the nature of MTC may pose challenges on the communication networks. For example, access control signaling resources become particularly exposed in some scenarios. For example, some scenarios include MTC devices in the form of sensor devices which monitor states of technological systems (e.g. industrial systems) or processes or sensor devices monitoring various environmental conditions such as temperature, pressure and vibrations. For such MTC devices (and the applications where these MTC devices are utilized) external events such as power grid failure, a pipeline damage, an earthquake or an industrial process failure may trigger a large amount of MTC devices wanting to access the communication network simultaneously, or substantially simultaneously, for the purpose of reporting the triggering events to their respective application servers. When a large number of MTC devices require network resources simultaneously, or substantially simultaneously, there is an increased risk of congestion or overload in the communication network. In addition to the above example scenario seen with respect to MTC devices, overload may of course also be caused by non-MTC devices, e.g. UEs that do involve human interaction. Such non-MTC devices may e.g. include devices such as cellphones, smartphones, tablet computers, gaming devices, personal digital assistants (PDAs), etcetera. To sum up, when a large number of UEs (e.g., MTC devices and/or non-MTC devices) require network resources simultaneously, or substantially simultaneously, there is an increased risk of congestion or overload in the communication network.

A known means for protecting the network access resources from overload in an LTE cell is known as the Access Class Barring (ACB) mechanism. For the purpose of this mechanism, each UE is a member of at least one Access Class (AC), which is stored in the USIM. An evolved NodeB (eNB) may announce the ACB state in each cell through the broadcast system information (SI). System Information Block Type 2 (SIB 2) of the SI lists the state of each AC through an Access Class Barring Factor (ACBF) associated with each AC, which has a value between 0 and 1. When a UE finds an AC in the SI which corresponds to one stored in the USIM, the UE generates a random value between 0 and 1. If the random value is lower than the ACBF of the concerned AC, the UE considers the cell as barred, i.e. it is not allowed to access it, for a random time period with a mean value governed by the Access Class Barring Time (ACBT) parameter included in the SI (in SIB 2). With the particular nature of MTC devices in mind the 3GPP is currently working on an extension of the ACB concept, called Extended Access Barring (EAB). EAB is a mechanism for the operator(s) to control mobile originating access attempts from UEs that are configured for EAB in order to prevent overload of the access network and/or the core network. In overload situations, the operator can restrict access from UEs configured for EAB while permitting access from other UEs.

Sometimes the ACB/EAB mechanism is not enough to protect a cell from overload. This may, for example, be because the mechanism may be slow to react to changes due to the pressure on the network access resources (because it relies on the rather infrequently transmitted system information), e.g. during sudden surges of access attempts from MTC devices which are more or less synchronized for one reason or the other (as exemplified above). It may also be because the chosen ACB/EAB parameters were not appropriate to handle the number of access attempts or because ACB/EAB was not used at all.

Another method for access load control is known from the US patent application publication US 2012/0163169 A1, which was published on 28 Jun. 2012. This publication describes an overload control apparatus and method for a MTC type communication service. The method described in this document resembles the EAB method in that it attempts to proactively notify MTC devices of an overload state in order to make them refrain from access attempts. A difference from the earlier-described EAB method is that the method and apparatus of this disclosure use a MAC (Medium Access Control) subheader instead of the system information to carry the overload indications to the MTC devices. More particularly, US 2012/0163169 A1 proposes to configure a so-called E/T/R/R/BI subheader of the MAC header to include an overload indicator. A concerned MTC device is required to check for possible overload indications before it attempts to access the network through the random access procedure. Hence, a MTC device which wants to access the network must first monitor the downlink until it receives a message including the MAC subheader triggered by a random access attempt from another UE, i.e. a UE different from the concerned UE. If the MAC subheader does not contain any overload indicator, the MTC device is allowed to initiate the random access procedure by transmitting a random access preamble to the base station. On the other hand, if the MAC subheader does include an overload indicator, the MTC device waits a certain time until it sends the random access preamble. If applying a procedure as disclosed in this disclosure, the base station may potentially send out a large amount of messages irrespective of the overload situation. Thus, unecessarily much system resources may potentially be consumed. Also, since MTC devices are supposed to check the overload situation before attempting to send their respective random access preambles, the overall procedure may become delayed in some situations. Potentially, the monitoring and reception of the MAC subheaders may also mean an increased energy consumption of the UE.

SUMMARY

It is in view of the above considerations and others that the various embodiments of the present invention have been made.

There is still a need to provide overload control in communication systems, particularly (though not exclusively) for MTC communication. In view of this, it is therefore a general object of the various embodiments of the present invention to provide for an alternative and improved overload, or congestion, control.

The various embodiments of the present invention as set forth in the appended independent claims address this general object. The appended dependent claims represent additional advantageous embodiments of the present invention.

According to an aspect, there is provided a method performed by a radio network node. The radio network node may be suitable for overload control in a communication network. A random access preamble is received from a user equipment (UE). Also, it is determined whether an overload condition exists. In response to determining that an overload condition exists, a Medium Access Control (MAC) Protocol Data Unit (PDU) is configured to accompany a Random Access Preamble Identifier (RAPID) subheader with a request to extend the time period during which the UE waits for reception of a MAC Random Access Response (RAR). The RAPID subheader and the accompanying request are transmitted to the UE.

The above-mentioned RAPID subheader may be a E/T/RAPID subheader.

In some embodiments, transmitting the RAPID subheader and the accompanying request to the UE may comprise transmitting the RAPID subheader without a corresponding MAC RAR. Also, transmitting the RAPID subheader without the corresponding MAC RAR may be configured to represent said accompanying request.

In some embodiments, a random access preamble identifier (ID) is derived from the random access preamble received from the UE. Furthermore, the random access preamble ID may be included into the RAPID field of the RAPID subheader.

In some embodiments, configuring the MAC PDU to accompany a RAPID subheader with a request to extend the time period during which the UE waits for reception of a MAC RAR may comprise including said request into a MAC RAR. Thus, a MAC RAR may be modified by the inclusion of said request.

Also, receiving the random access preamble may comprise receiving the random access preamble on a Physical Random Access Channel (PRACH).

In still further embodiments, a random access preamble ID included in the RAPID subheader for identifying the UE may be identified. This may be done in response to determining that the overload condition no longer exists. Moreover, a MAC RAR corresponding to said RAPID subheader may be transmitted to the UE identified by said random access preamble ID.

According to another aspect, there is provided a method performed by a user equipment (UE). A random access preamble is transmitted to a radio network node. Also, a RAPID subheader and an accompanying request to extend the time period during which the UE waits for reception of a MAC Random Access Response (RAR) are received from the radio network node. In response to receiving the RAPID subheader and the accompanying request, a timer (or, timer function) may be started. A Physical Downlink Control Channel (PDCCH) may then be monitored for reception of the MAC RAR until the timer has reached a maximum time limit. The maximum time limit corresponds to the extended time period, i.e. the time period during which the UE waits for reception of a MAC RAR.

The RAPID subheader may be a E/T/RAPID subheader.

In some embodiments, receiving the RAPID subheader and the accompanying request may comprise receiving the RAPID subheader without a corresponding MAC RAR. Receiving the RAPID subheader without the corresponding MAC RAR may be configured to represent said accompanying request.

In alternative embodiments, receiving the RAPID subheader and the accompanying request may comprise receiving the RAPID subheader and a MAC RAR including said request.

The RAPID subheader may comprise a random access preamble identifier (ID) of the UE in the RAPID field of the RAPID subheader.

According to yet another aspect, there is provided a radio network node. The radio network node comprises a receiver configured to receive a random access preamble from a user equipment (UE). The radio network node also comprises a transmitter. Furthermore, the radio network node comprises a processor and a memory. The memory stores computer program code, which, when run in the processor causes the radio network node to: determine whether an overload condition exists; and in response to determining that an overload condition exists, configure, a Medium Access Control (MAC) Protocol Data Unit (PDU) to accompany a Random Access Preamble Identifier (RAPID) subheader with a request to extend the time period during which the UE waits for reception of a MAC Random Access Response (RAR); and transmit, via the transmitter, the RAPID subheader and the accompanying request to the UE.

The RAPID subheader may be a E/T/RAPID subheader.

The transmitter is configured to transmit the RAPID subheader without a corresponding MAC RAR to the UE. A transmission of the RAPID subheader without the corresponding MAC RAR may be configured to represent the accompanying request.

In some embodiments, the memory and the computer program code may be configured to, with the processor, cause the radio network node to derive a random access preamble identifier (ID) from the random access preamble received from the UE, and furthermore to include the random access preamble ID in the RAPID field of the RAPID subheader.

In some embodiments, the memory and the computer program code may be configured to, with the processor, cause the radio network node to include said request into a MAC RAR.

The receiver may be configured to receive the random access preamble comprises receiving the random access preamble on a Physical Random Access Channel (PRACH).

Also, in response to a determination that the overload condition no longer exists, the memory and the computer program code may be configured to, with the processor, cause the radio network node to identify the random access preamble ID included in the RAPID subheader for identifying the UE; and transmit (via the transmitter) a MAC RAR corresponding to said RAPID subheader to the UE identified by said random access preamble ID.

Furthermore, the radio network node may be an evolved eNodeB (eNB).

According to still another aspect, there is provided a user equipment (UE). The UE comprises a transmitter configured to transmit a random access preamble to a radio network node. Furthermore, a receiver is configured to receive a Random Access Preamble Identifier (RAPID) subheader and an accompanying request to extend the time period during which the UE waits for reception of a MAC Random Access Response (RAR) from the radio network node. The UE also comprises a processor and a memory. The memory stores computer program code, which, when run in the processor causes the UE to, in response to a reception of said request: start a timer and monitor a Physical Downlink Control Channel (PDCCH) for reception, via the receiver, of the MAC RAR until the timer has reached a maximum time limit, the maximum time limit corresponding to the extended time period, i.e. the time period during which the UE waits for reception of a MAC RAR.

The above-mentioned RAPID subheader may be a E/T/RAPID subheader.

The receiver may be configured to receive the RAPID subheader without a corresponding MAC RAR.

In some embodiments, the memory and the computer program code may be configured to, with the processor, cause the UE to interpret a reception of the RAPID subheader without the corresponding MAC RAR to represent the accompanying request.

In some embodiments, the RAPID subheader may comprise a random access preamble identifier (ID) of the UE in the RAPID field of the RAPID subheader.

The receiver may also be configured to receive the RAPID subheader and a MAC RAR including said request, e.g. a modified MAC RAR including the request.

Moreover, the memory and the computer program code may be configured to, with the processor, cause the UE to process and interpret the above-mentioned request.

BRIEF DESCRIPTION OF THE DRAWINGS

These and other aspects, features and advantages of the invention will be apparent and elucidated from the following description of embodiments of the present invention, reference being made to the accompanying drawings, in which.

DETAILED DESCRIPTION

The invention will now be described more fully hereinafter with reference to the accompanying drawings, in which certain embodiments of the invention are shown. The invention may, however, be embodied in many different forms and should not be construed as limited to the embodiments set forth herein; rather, these embodiments are provided by way of example so that this disclosure will be thorough and complete, and will fully convey the scope of the invention to those persons skilled in the art. Like reference numbers refer to like elements or method steps throughout the description.

Figure 1A:
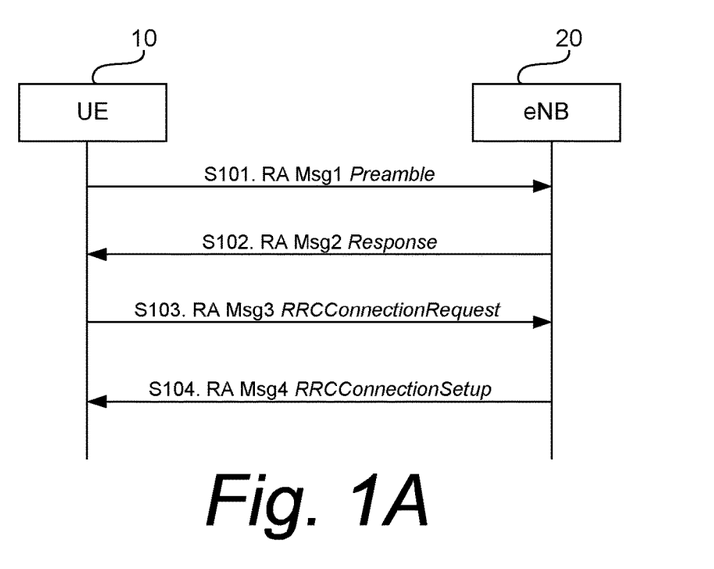
FIGS. 1a and 1b illustrate example random access procedures.

FIG. 1a illustrates an example random access procedure of a UE in a 3GPP LTE communication system. As a process for a user equipment, UE, to be attached to a communication network, a random access procedure is generally performed in the cases of initial attachment, handover, scheduling request, uplink time synchronization, to establish a Radio Resource Control (RRC) connection (i.e. transition from the RRC-IDLE to the RRC-CONNECTED state), and so forth. In other words, UEs generally perform random access for initial attachment and data transmission.

As used in the following the term "UE" is any device, which can be used by a user to communicate. Also, the term UE may be referred to as a mobile terminal, a terminal, a user terminal (UT), a wireless terminal, a wireless communication device, a wireless transmit/receive unit (WTRU), mobile phone, cell phone, etc. Yet further, the term UE includes MTC devices, which do not necessarily involve human interaction. The term "radio network node" as used herein generally denotes a fixed point being capable of communicating with the UE. As such, it may be referred to as a base station, a NodeB or an evolved NodeB (eNB), access point, relay node, etcetera.

Referring to the random access procedure illustrated in FIG. 1a, an example random access procedure involving a transition from RRC-IDLE to RRC-CONNECTED state is shown. A UE 10 selects a random access preamble and transmits S101 the selected random access preamble RA Msg1 to the radio network node 20, e.g., on the Physical Random Access Channel (PRACH). The UE 10 may e.g. select the random access preambles randomly. The number of available random access preambles may be limited, e.g.

limited to 64 in a certain radio cell. Optionally, the random access preambles may be divided into two groups, e.g. Group A and Group B. The UE may then select the group from which the UE 10 selects the random access preamble. Also, the UE 10 may select the group based on potential data message size (e.g. the data available for transmission in step three (see hereinbelow) of the random access procedure, plus MAC header and any additional MAC control elements). Additionally, or alternatively, the UE 10 may select the group based on channel quality (e.g. estimated in terms of measured downlink path loss). In some embodiments, two conditions may have to be met in order for the UE 10 to select a random access preamble from Group B: the potential data message size has to exceed a certain threshold and the estimated path loss has to be lower than a certain threshold.

Figure 2:
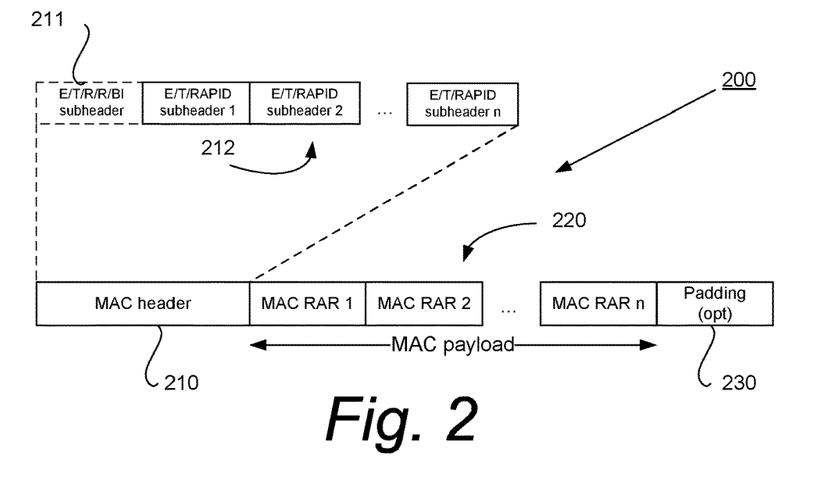
FIG. 2 shows an example constitution, or format, of a MAC PDU.

Subsequently, i.e. after having received the random access preamble, the radio network node 20 transmits S102 a random access response (RAR) RA Msg2 to the UE 10. With reference to FIG. 2, an example of a Random Access Response (RAR) message (i.e. RA Msg2 transmitted S102 from the radio network node 20 to the UE 10) is shown. A medium access control (MAC) protocol data unit (PDU) format as defined in Technical Specification 3GPP TS 36.321 V.11.0.0 (2012-09) and as exemplified in FIG. 2 comprises a MAC header 210 and zero, one or more MAC RARs 220. The MAC RARs 220 are so-called payload fields. Optionally, a padding field 230 can be included. The MAC header 210 has a variable length and includes at least one MAC subheader 211, 212. Each subheader 212 except a Backoff (BI) indicator subheader 211 may correspond to one MAC RAR. If included, the BI subheader 211 may be the first subheader included within the MAC header 210.

Figure 3A:
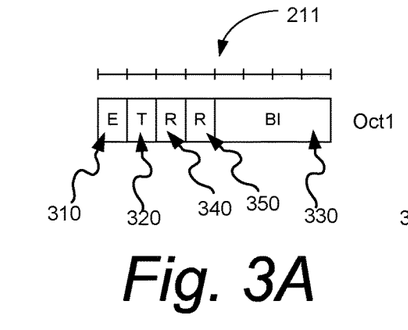
FIG. 3a shows an example constitution, or format, of a MAC subheader of FIG. 2.
Figure 3B:
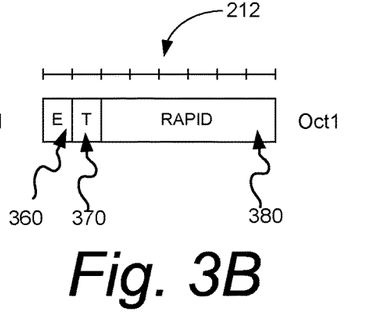
FIG. 3b shows an example constitution, or format, of another MAC subheader of FIG. 2.

Referring now to FIG. 3a, the subheader denoted 211 shown in FIG. 2 may comprise five header fields 310-350. In this example embodiment, there are an E field 310 of one bit, a T field 320 of one bit, a BI field 330 of four bits, and two reserved (R) fields 340, 350 of one bit each. In general, such a structure is referred to as an E/T/R/R/BI format, or structure. Sometimes, such a structure is called a Backoff Indicator subheader. Here, the E field 310 may be an extension field indicating whether or not an additional field is comprised in the MAC header 210. For example, where the E field 310 is set to 1, there may exist follow-up E/T/RAPID (Random Access Preamble IDentifier) fields 212. Where the E field 310 is set to 0, MAC RARs 220 or padding 230 may be started from the next byte. The T field 320 is a type flag indicating whether or not the MAC subheader 212 has an access ID (i.e. is a RAPID sub header, also sometimes referred to as a E/T/RAPID subheader) or BI. In a general message, 0 may be used as an R field and a general UE 10 may perform a procedure irrespective of the R fields included in the RAR message. Turning now to FIG. 3b, the MAC subheaders denoted 212 (see FIG. 2) may comprise so-called E/T/RAPID subheaders. A MAC E/T/RAPID subheader 212 may comprise three header fields. For example, a MAC E/T/RAPID subheader 212 may comprise an E field 360 of one bit, a T field 370 of one bit and a RAPID field 380 of six bits. Here, the RAPID field may generally indicate an identification (ID) of a random access preamble.

Figure 4:
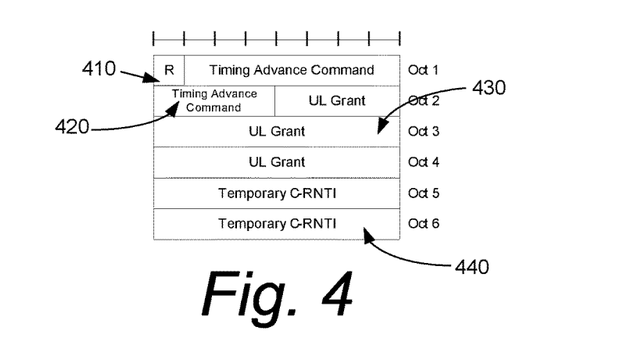
FIG. 4 shows an example constitution, or format, of a MAC RAR of FIG. 2.

Furthermore and as illustrated in FIG. 4, a MAC RAR 220 may generally comprise four fields, as defined in *Technical Specification* 3GPP TS 36.321 V.11.0.0 (2012-09). As exemplified in 3GPP TS 36.321 V.11.0.0 (2012-09), each MAC RAR may comprise six octets, each octet comprising eight bits. A first field 410 may be a reserved (R) field of one bit. A second field 420 may be a Timing Advance Command field of, e.g., eleven bits. A third field 430 may comprise an uplink (UL) grant field. The third field may be of e.g. 20 bits. Finally, a fourth field 440 may comprise a Temporary C-RNTI (Cell Radio Network Temporary Identifier). The fourth field 440 may be of 16 bits. The MAC RAR 220 is further detailed in e.g. sections 6.1.5 and 6.2.3 of 3GPP TS 36.321 V.11.0.0 (2012-09).

Referring again to FIG. 1a, when the UE 10 successfully receives a response message, RA Msg 2, from the radio network node 20 (i.e. in response to the random access preamble sent in RA Msg 1), the UE 10 transmits S103 RA Msg3 including a UE identifier (ID) to the radio network node 20. When doing so, the UE 10 may use radio resources which have been allocated to the UE 10 by the radio network node 20, as is known among persons skilled in the art. The RA Msg 3 is sometimes referred to as a RRCConnectionRequest message. Subsequently, the radio network node 20 receiving the RA Msg 3 transmits S104 a RA Msg 4 to complete, or conclude, the contention resolution. This RA Msg4 is sometimes referred to as a RRCConnectionSetup message. Consequently, the UE 10 receives S104 the contention resolution message RA Msg 4. The random access procedure is completed when the UE 10 receives S104 the contention resolution message RA Msg 4.

Figure 1B:
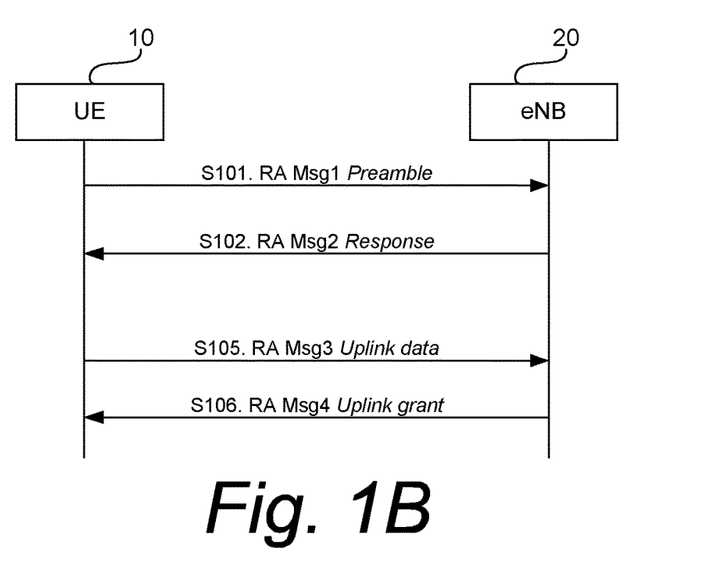

Random access procedures are also used in other scenarios, i.e. scenarios that are different from the above-described scenario with respect to FIG. 1a. For example, another scenario is when the UE is already in the RRC-Connected state, but lacks uplink synchronization (e.g. lacks a valid timing advance). An example of such procedure is schematically illustrated in FIG. 1b. Steps S101 and S102 are the same or substantially the same as steps S101 and S102 of FIG. 1a and will therefore not be further detailed here. Compared to the procedure of FIG. 1a, the RA Msg3 is different. In the procedure of FIG. 1b, the UE 10 can transmit S105 (to the radio network node 20) a RA Msg3 which includes a C-RNTI (Cell Radio Network Temporary Identifier). The RA Msg 3 may e.g. be transmitted S105 on a Physical Uplink Shared Channel (PUSCH). Optionally, the RA Msg3 may additionally include a buffer status report (BSR) and/or user data. Whether or not a BSR and/or user data is included may, for example, be determined in dependence on whether there is room available in the allocated transmission resources. As a mere example, whether or not the RA Msg3 includes a BSR and/or user data may, be determined by the following rule: If all user data can be fit into a transport block, then inclusion of user data has priority over BSR, but if not all user data can be fit into the transport block, then the BSR has priority over the user data. The fourth message of the random access procedure illustrated in FIG. 1b is also different from the fourth message of FIG. 1a. In FIG. 1b, the fourth message (transmitted S106 from the radio network node 20 to the UE 10) comprises an uplink grant addressed to the C-RNTI that the UE transmitted in RA Msg3.

More detailed descriptions of random access procedures can be found in literature, e.g., in "*4G LTE/LTE-Advanced for Mobile Broadband*" by Erik Dahlman, Stefan Parkvall and Johan Sköld, Academic Press, 2011, ISBN: 978-0-12-385489-6, see e.g. chapter 14.3.

While FIG. 1a and FIG. 1b show two example random access procedures according to two different scenarios, other scenarios and thus random access procedures can also be conceivable. Therefore, the herein detailed embodiments of the invention should not be limited to the above two scenarios.

An example embodiment of the present invention will now be described with reference to FIGS. 5 and 6. FIGS. 5*a* and 5*b* illustrate signaling diagrams, or flow charts, of the example procedures. FIGS. 6*a* and 6*b* show example formats of a MAC PDU.

A UE 10 transmits S101 a random access preamble (e.g. on a PRACH channel) to a radio network node 20, here exemplified by an eNB. More particularly, the UE 10 may be an unserved UE 10, i.e. a UE that is not yet served by the radio network node 20. Therefore, the UE 10 may hereinafter be referred to as an unserved UE". The radio network node 20 subsequently receives S101 the random access preamble from the UE 10.

Upon receiving S101 the random access preamble from the UE 10, the radio network node 20 determines S510 whether an overload condition exists. An overload condition may be indicative of the radio network node 20 having insufficient resources to respond properly to all UEs from which random access preambles were received by the radio network node 20. Or said differently, the overload condition may be indicative of the radio network node 20 having insufficient resources to respond by a MAC RAR including an indication of the resources to be used on the uplink (i.e. the direction from the UE 10 to the radio network node 20) to all UEs from which random access preambles were received by the radio network node 20.

In order to determine whether an overload condition, or overload state, exists the radio network node 20 is configured to monitor its resource situation, i.e. its available resources. The resources may e.g. include transmission resources, processing resources or both transmission resources and processing resources. Transmission resources may, e.g., include transmission resources for transmission of a Random Access Response MAC PDU and/or transmission resources to be allocated for subsequent uplink (UL) transmissions, such as transmission of RA Msg3 (see FIG. 1*b*). Processing resources may, e.g., include processing resources for preparing and transmitting the Random Access Response MAC PDU and/or processing resources for scheduling of transmission resources to be allocated for subsequent uplink transmission of RA Msg3 (see FIG. 1*b*). Furthermore, the resources may additionally, or alternatively, include memory resources or other limited hardware or software resources. In some example implementations, a component such as a scheduler (sometimes referred to as scheduling unit or scheduling function) of the radio network node 20 may be configured to monitor the transmission resources the radio network node 20 has allocated. Also, the scheduler of the radio network node 20 may be configured to monitor pending downlink data in scheduling queues, outstanding (i.e. received but not yet responded to) scheduling requests, random access preambles and/or buffer status reports, etc. Consequently, the radio network node 20 may rather accurately predict the availability of current, thus available, transmission resources and other resources (e.g. processing resources as mentioned above).

Thus, the radio network node 20 determines S510 whether the radio network node 20 in question has enough resources (e.g. transmission resources, processing resources, both transmission resources and processing resources, and/or memory resources, etc) available to be able to respond properly to all random access preambles received by the radio network node 20. That is, the radio network node 20 determines S510 whether an overload condition exists for the radio network node 20. This determination S510 may be performed immediately, or substantially immediately, upon receiving S101 the random access preamble from the unserved UE 10. Alternatively, the determination may be performed within or after a pre-defined time period, which may e.g. be 5, 7, 9, 11 or 13 milliseconds after receiving S101 the random access preamble.

Optionally, the radio network node 20 may additionally, or alternatively, determine S510 whether there exists a condition indicative of overload, or congestion, in other nodes of the communication network. As a mere example and based on the assumption that there is an overload in the communication network, the radio network node 20 may e.g. be notified by a MME (Mobility Management Entity) of the overload condition. In other words, the MME can determine whether there exists an overload condition in the communication network and if it does, the MME can notify the radio network node 20 about the overload condition. Accordingly, the radio network node 20 can determine whether an overload condition, or overload state, exists in the communication network.

Figure 5A:
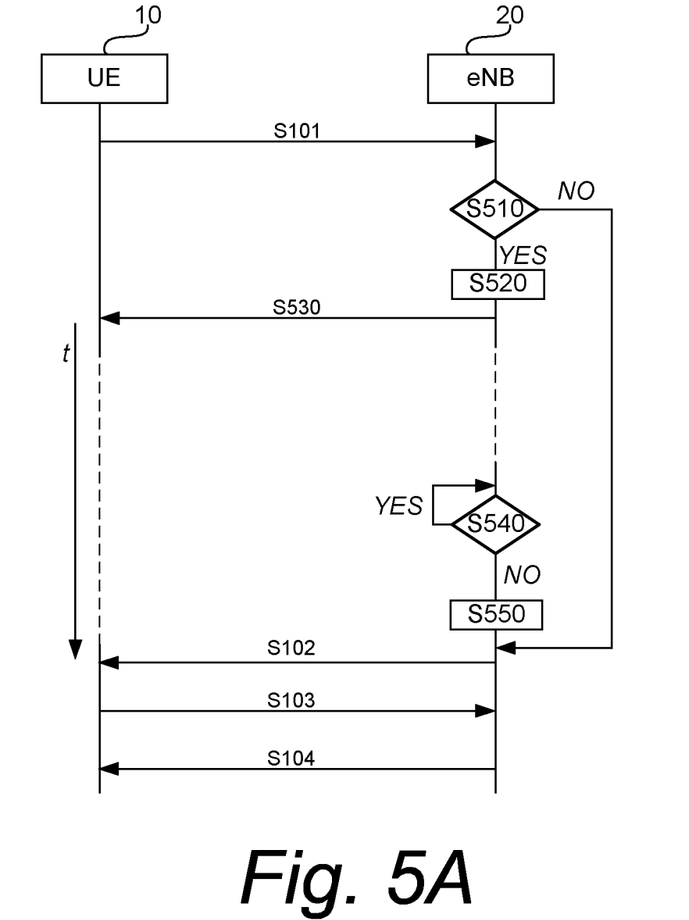
FIGS. 5a and 5b show signaling diagrams, or flow charts, of example embodiments.
Figure 5B:
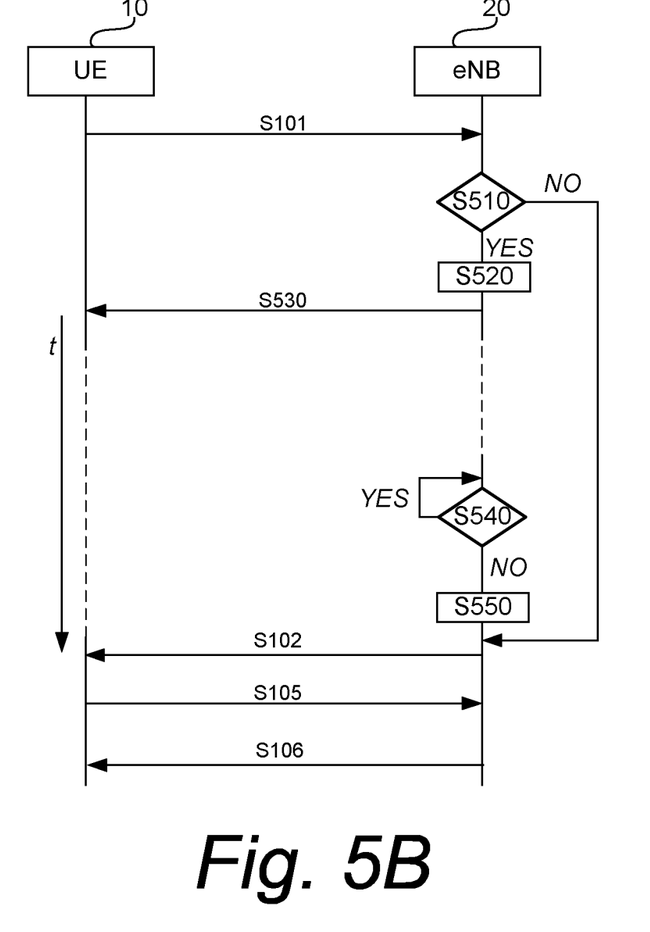

If, or when, the radio network node 20 determines S510 (i.e. "NO" in FIG. 5*a* and FIG. 5*b*) that there is no overload condition, the method can directly continue to steps S102-S104 (FIG. 5*a*). That is, if or when it is determined S510 that there exists available resources to respond properly to all UEs from which random access preambles were received by the radio network node 20, the method can directly continue to steps S102-S104. These steps are the same or substantially the same as the steps S102-S104 described earlier with respect to FIG. 1*a* and will therefore not be repeated here. Alternatively, the method continues directly to steps S102-S106 (FIG. 5*b*). The steps are the same or substantially the same as the steps S102-S106 described earlier with respect to FIG. 1*b* and will therefore not be repeated here.

However, if or when it is determined S510 that the radio network node 20 does experience an overload condition (i.e. "YES" in FIGS. 5*a* and 5*b*), the radio network node 20 generally has insufficient resources (i.e. there are not sufficient resources) to respond properly to all UEs from which random access preambles were received by the radio network node 20. If so, the radio network node 20 continues by configuring S520 a MAC Medium Access Control (MAC) Protocol Data Unit (PDU) to accompany one or several RAPID subheaders 212 (see FIG. 6) with corresponding requests to extend the time during which the UE(s) in question wait(s) for reception of a subsequent MAC Random Access Response (RAR). As will be further detailed with respect to an example embodiment with reference to FIG. 6*a*, the accompanying request must not necessarily be an explicit request. Rather, and as will be described with reference to FIG. 6*a*, the accompanying request may advantageously be an implicit request.

Figure 6A:
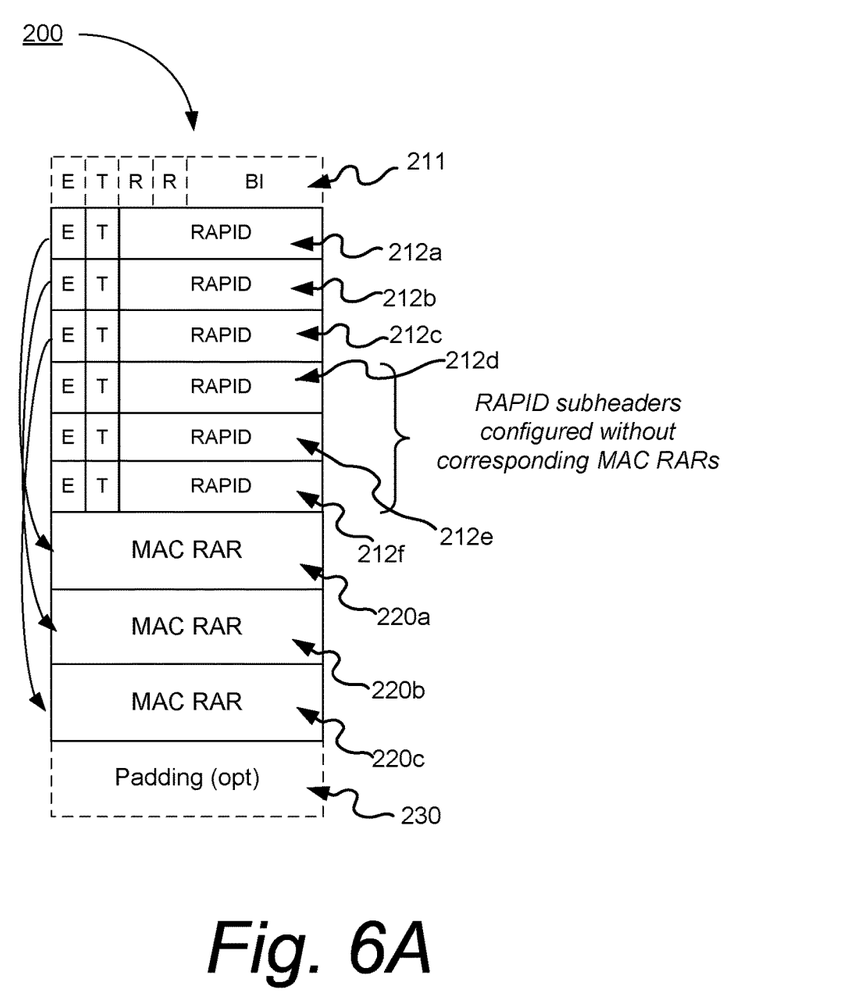
FIGS. 6a and 6b show example constitutions, or formats, of a MAC PDU according to example embodiments.

With reference to FIG. 6*a*, a MAC PDU is exemplified to include an optional E/T/R/R/BI subheader 211, zero, one or several E/T/RAPID subheaders 212, as well as zero, one or several MAC RARs and an optional padding field 230 (see also FIG. 2). For the sake of illustration and not limitation, assume that the radio network node 20 has determined S510 that there is an overload condition. Thus, the radio network node 20 has determined that it does not have sufficient resources to serve all of the UEs from which it received random access preambles. Assume that the radio network node 20 has received random access preambles from six UEs and that it has, furthermore, determined that there are currently sufficient resources to serve only three UEs. In such example situation, the radio network node 20 may configure S520 the MAC PDU 200 to accompany those E/T/RAPID subheaders 212*a*, 212*b*, 212*c* of the UEs to be served by the radio network node 20 with corresponding MAC RARs 220a, 220b, 220c. The corresponding MAC RARs 220a, 220b, 220c may be MAC RARs having a format as described earlier with respect to FIG. 2. Additionally, the radio network node 20 may configure S520 the MAC PDU 200 to accompany those E/T/RAPID subheaders 212d, 212e, 212f of the UEs that cannot yet be served by the radio network node 20 without corresponding MAC RARs. According to this example embodiment, configuring S520 the E/T/RAPID subheaders 212d, 212e, 212f without any corresponding MAC RARs may represent the request to the concerned UEs to extend the time during which these UEs wait for reception of a MAC RAR. Consequently, those UEs that cannot yet be served by the radio network node 20 due to the overload condition can be requested to wait for subsequent reception of a MAC RAR.

Figure 7:
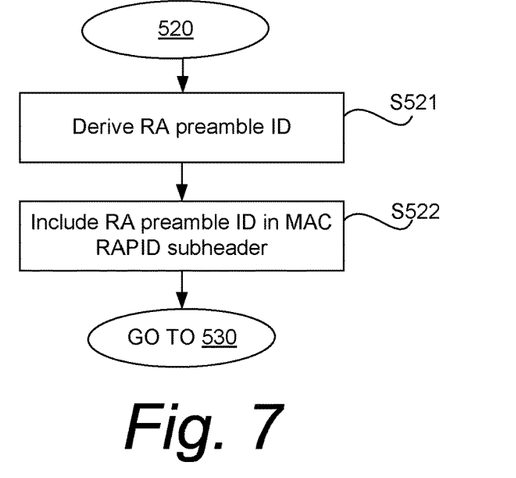
FIG. 7 is a flowchart of method steps according to an example embodiment.

When the MAC PDU 220 has been configured S520, by the radio network node 20, to accompany zero, one or several of the E/T/RAPID subheaders 212a, 212b, 212c with corresponding MAC RARs and to accompany zero, one or several of the E/T/RAPID subheaders 212d, 212e, 212f without corresponding MAC RARs the MAC PDU 220 is ready for transmission. As will be appreciated and as is also illustrated in FIG. 7, the configuration S520 of the MAC PDU 220 may comprise deriving S521 a random access preamble identifier (ID) from the random access preamble received S101 from the unserved UE and, also, including this random access preamble ID into the RAPID field of the E/T/RAPID subheaders 212 in question.

With further reference to FIG. 6a, it may be advantageous to configure the MAC PDU 220 such that those E/T/RAPID subheaders 212d, 212e, 212f lacking corresponding MAC RARs are placed at one end of the list of E/T/RAPID subheaders 212. For example, those E/T/RAPID subheaders 212d, 212e, 212f lacking corresponding MAC RARs may be placed last in the list of E/T/RAPID subheaders 212. As is also illustrated in FIG. 6a, the first E/T/RAPID subheader 212a in the list of E/T/RAPID subheaders then corresponds to the MAC RAR 220a appearing first in the list of MAC RARs. Likewise, the second E/T/RAPID subheader 212b corresponds to the second MAC RAR 220b and the third E/T/RAPID subheader 212c corresponds to the third MAC RAR 220c.

The MAC PDU 220 and the thus accompanying request can be transmitted S530 to the unserved UE 10 that transmitted S101 the random access preamble previously. In this example embodiment, the accompanying request to extend the time during which the unserved UE 10 waits for reception of a MAC RAR is an implicit request. The request is implicit in that the request is represented by the fact that a E/T/RAPID subheader, e.g. E/T/RAPID subheader 212d, is configured without a corresponding MAC RAR. Or said differently, a E/T/RAPID subheader 212d lacks a corresponding MAC RAR. Therefore, when the unserved UE 10 receives S530 a E/T/RAPID subheader 212d which lacks a corresponding MAC RAR this is interpreted by the unserved UE 10 to represent the request to extend the time during which it waits for reception of a MAC RAR. Thus, the unserved UE 10 will be informed by the radio network node 20 that the radio network node 20 has determined that there is an overload condition and, hence, that the radio network node 20 currently does not have sufficient, i.e. enough, capacity (be it transmission resources, processing resources or both).

The time period during which the unserved UE 10 should wait for reception of a subsequent MAC RAR must not necessarily be specified in the MAC PDU 220 transmitted S530 from the radio network node 20 to the unserved UE 10. Instead, the time period during which the unserved UE 10 should wait for reception of a subsequent MAC RAR may be of a fixed length, which may be known to the UE 10 in advance. For example, the fixed time length could be standardized, e.g. by hard coding into UEs 10. Alternatively, it could be provided to the UE through USIM (Universal Subscriber Identity Module) configuration. Yet further, it could be possible to provide this information via system information (SI) transmissions.

The yet unserved UE 10 will, in response to receiving S530 the MAC PDU 220 including the E/T/RAPID subheader and the accompanying request, start a timer and begin monitoring a Physical Downlink Control Channel (PDCCH) for reception of the MAC RAR until the timer has reached a maximum time limit t. The maximum time limit corresponds to the earlier-mentioned extended time period, i.e. the time period during which the unserved UE 10 should wait for reception of a subsequent MAC RAR. More particularly, the MAC RAR may be transmitted on a Physical Downlink Shared Channel (PDSCH) indicated by a downlink resource assignment addressed to a Random Access RNTI (RA-RNTI) on the PDCCH. Thus, the UE 10 monitors the PDCCH.

The radio network node 20 may optionally determine S540 whether the overload condition still exists. The determination as to whether the overload condition still exists can be performed continuously. However, in order to save internal processing resources this determination can advantageously be made at pre-defined intervals, such as every 5, 10, 15, 30 or 60, 120, 180, 360 milliseconds. Accordingly, a radio network node 20 that has previously determined an overload condition may continue monitoring the load condition for a certain period of time, e.g. until the overload condition no longer exists. If or when the overload condition no longer exists (i.e. there is no overload, see "NO" in FIGS. 5a and 5b), the radio network node 20 determines, or concludes, that it has sufficient resources available and, thus, the radio network node 20 can transmit S102 a MAC RAR to the yet unserved UE 10. More particularly, if or when it has been determined S540 that the overload condition no longer exists, the radio network node 20 can determine the random access preamble ID of the E/T/RAPID subheader for identifying the unserved UE 10 and, then, transmit S102 a corresponding MAC RAR to the thus identified unserved UE 10. The MAC RAR may be a MAC RAR as described with respect to FIG. 2. Thus, upon receiving the MAC RAR including, among other things, an UL grant field the unserved UE 10 can be allocated uplink resources for subsequent communication. Consequently, the method can then continue to steps S103-S104 (FIG. 5a). The steps S103-S104 are the same or substantially the same as the steps S103-S104 described earlier with respect to FIG. 1a and will therefore not be repeated here. Alternatively, the method may continue to steps S105-S106 (FIG. 5b). The steps S105-S106 are the same or substantially the same as the step S105 described earlier with respect to FIG. 1b and will therefore not be repeated here.

In some embodiments, if or when it has been determined S540 that the overload condition still exists after the maximum pre-defined time period t, the radio network node 20 may be configured to re-transmit a new request for requesting the UE 10 to extend the time period during which it waits for reception of the MAC RAR. Thus, the waiting period for the UE 10 can be extended even further, when necessary or appropriate. For example, the radio network node 20 may be configured to temporarily store the earlier-transmitted RAPID subheader and the accompanying request and re-transmit the same if or when it has been determined S540 that the overload condition still exists after a the maximum pre-defined time period t.

A further option which may be conceived in some embodiments is to not only extend the time period t during which the UE 10 is requested to wait for reception of the MAC RAR, but to also introduce a "gap" in the time period, e.g. starting at the reception S530 of the MC PDU. If so, the remainder of the extended time period would be resumed by the UE 10 at a later time. The length of the "gap" may be known to the UE 10 in advance in a similar way as previously described for the length of the time period t with which the UE 10 is requested to extend the time it waits for reception of the MAC RAR.

Figure 6B:
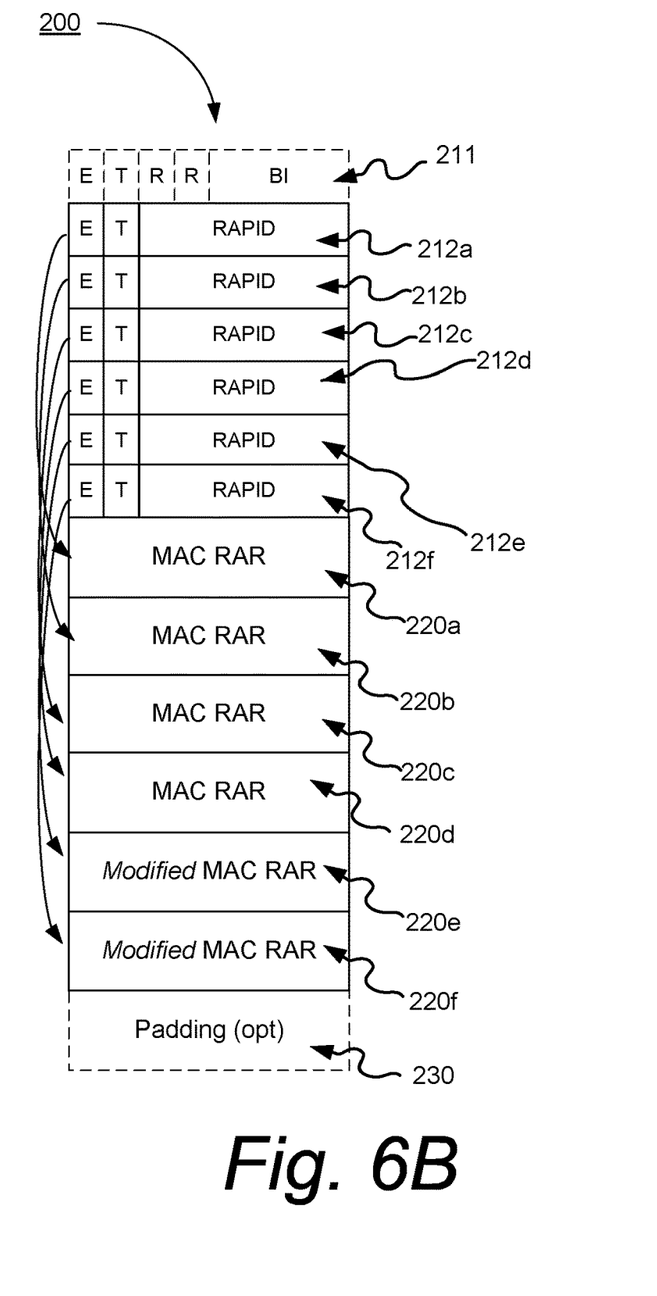

Turning now to FIG. 6b, an alternative embodiment is illustrated. In this embodiment, the request to extend the time during which the UE(s) in question waits for reception of a subsequent MAC RAR is an explicit request. In this embodiment, configuring S520 the MAC PDU comprises including (e.g. for one ore more RAPID subheaders) said request into a corresponding MAC RAR. In other words, the MAC PDU can be configured to accompany one or several RAPID subheaders with corresponding modified MAC RARs, wherein each of the modified MAC RARs include said request. With reference to FIG. 6b, a MAC PDU is exemplified to include an optional E/T/R/R/BI subheader 211, zero, one or several E/T/RAPID subheaders 212, as well as zero, one or several MAC RARs and an optional padding field 230 (see also FIG. 2). For the sake of illustration and not limitation, assume that the radio network node 20 has determined S510 that there is an overload condition. Thus, the radio network node 20 has determined that it does not have sufficient resources to serve all of the UEs from which it received random access preambles. Assume that the radio network node 20 has received random access preambles from six UEs and that it has, furthermore, determined that there are currently sufficient resources to serve only four UEs. In such example situation, the radio network node 20 may configure S520 the MAC PDU 200 to accompany those E/T/RAPID subheaders 212a, 212b, 212c, 212d of the UEs to be served by the radio network node 20 with corresponding MAC RARs 220a, 220b, 220c, 220d. The corresponding MAC RARs 220a, 220b, 220c, 220d may be MAC RARs having a format as described earlier with respect to FIG. 2. Additionally, the radio network node 20 may configure S520 the MAC PDU 200 to accompany those E/T/RAPID subheaders 212e, 212f of the UEs that cannot yet be served by the radio network node 20 with corresponding modified MAC RARs 220e, 220f. As used herein, a modified MAC RAR includes the earlier-mentioned request. The MAC RAR can be modified in various ways to include said request. In one example implementation, one or more of the fields of the MAC RAR is/are modified to include the request. For example, the Reserved field (R) 410 (see FIG. 2) could be used for inclusion of the request. In one advantageous embodiment, the setting of the Reserved field 410 is altered to include a value which represents the request. For instance, altering the setting (e.g. by setting the field 410 to 1, instead of 0) of the first field 410 of the MAC RAR, it is possible to indicate to the UE 10 that it should extend the time during which the UE(s) in question waits for reception of a subsequent MAC RAR. Thus, altering the setting of the Reserved field (R) can be interpreted by the UE to represent a request to the UE to extend the time during which the UE(s) in question waits for reception of a subsequent MAC RAR. According to the example of FIG. 6b, configuring S520 the E/T/RAPID subheaders 212e, 212f with corresponding modified MAC RARs (i.e. MAC RARs including the request) may thus represent the request to the concerned UEs to extend the time during which these UEs wait for reception of a MAC RAR. Consequently, those UEs that cannot yet be served by the radio network node 20 due to the overload condition can be requested to wait for subsequent reception of a MAC RAR. With further reference to FIG. 6b, it may be advantageous to configure the MAC PDU 220 such that those E/T/RAPID subheaders 212e, 212f having corresponding modified MAC RARs 220e, 220f are placed at one end of the list of E/T/RAPID subheaders 212. For example, those E/T/RAPID subheaders 212e, 212f having the corresponding modified MAC RARs may be placed last in the list of E/T/RAPID subheaders 212. As is also illustrated in FIG. 6b, the first E/T/RAPID subheader 212a in the list of E/T/RAPID subheaders then corresponds to the MAC RAR 220a appearing first in the list of MAC RARs. Likewise, the second E/T/RAPID subheader 212b corresponds to the second MAC RAR 220b and the third E/T/RAPID subheader 212c corresponds to the third MAC RAR 220c, and so forth.

As will be appreciated, there are other ways of implementing an explicit request too. For example, configuring a MAC RAR such that the MAC RAR includes a new parameter (or, a set of parameters) would be conceivable. As a mere example, a new parameter (or, a set of parameters) may replace one or more fields of one or more MAC RARs in the list of MAC RARs (see. FIGS. 2 and 4). Accordingly, such modified MAC RARs would appear at the place in the list of MAC RARs corresponding to the order of the E/T/RAPID subheaders in the list of E/T/RAPID subheaders in a similar way as illustrated in FIG. 6b. In some embodiments, the explicit request could be embodied by the new parameter where the new parameter would represent an indication (thus, request), e.g. in the form of a one bit flag, indicating that the UE 10 in question should extend the time during which it waits for reception of the MAC RAR. As an alternative, the above-mentioned parameter (or, set of parameters) could comprise information about the length of the time t during which the UE 10 is requested to wait for reception of the MAC RAR. Thus, the length of the time t during which the UE 10 waits for reception of the MAC RAR (i.e., the extended time, or waiting time) could be determined on a case-by-case basis, which may be advantageous as it provides a comparatively more dynamic method.

Figure 8:
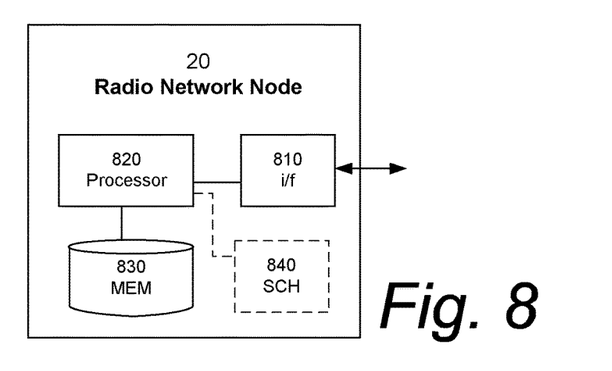
FIG. 8 shows an example embodiment of a radio network node such as an evolved NodeB.

Turning now to FIG. 8, a radio network node 20 according to an example embodiment will be described. The radio network node 20 may be configured to perform the earlier described methods. The radio network node 20, which may for example be an evolved NodeB, comprises a communication interface 810, a processor 820 and memory 830. In this example embodiment, the communication interface 810 comprises a receiver and a transmitter. In alternative embodiments, the receiver and transmitter functionalities are combined into one single unit, a transceiver. The receiver 810 may be configured to receive a random access preamble from an unserved UE 10, e.g. on a PRACH channel. Also, the memory 830 stores computer program code, which when run in the processor 820 causes the radio network node 20 to determine whether an overload condition exists; and in response to determining that an overload condition exists, to configure a MAC PDU to accompany a RAPID subheader (e.g. a E/T/RAPID subheader) with a request to extend the time period during which the unserved UE 10 waits for reception of a MAC RAR, and to transmit, via the transmitter 810, the RAPID subheader and the accompanying request to the UE 10. Additionally, the memory 830 may store computer program code, which when run in the processor 820 causes the radio network node 20 to include said request into a MAC RAR for modifying the MAC RAR.

As described hereinabove, the radio network node 20 is configured to determine whether there exists an overload condition. Thus, the radio network node 20 may be configured to determine whether the radio network node 20 has sufficient resources to respond properly to the UEs from which it has received random access preambles. To this end, the radio network node 20 may be configured to monitor its resource situation, i.e. its available resources. These resources may relate to transmission resources, processing resources or both. These resources may additionally, or alternatively, relate to memory resources or other limited resources of the radio network node 20. In one embodiment, the memory 830 and the computer program code may be configured to, with the processor 820, cause the radio network node 20 to monitor its resource situation, i.e. its available resources. In another example implementation, the radio network node may additionally, or alternatively, comprise a scheduler 840, which can be in charge of at least some of the monitoring of the available resources.

In one advantageous embodiment, the transmitter 810 is configured to transmit the RAPID subheader without a corresponding MAC RAR. A transmission of the RAPID subheader without a corresponding MAC RAR can be used to represent the earlier-mentioned request to extend the time period during which the unserved UE 10 waits for reception of a subsequent MAC RAR.

The memory 830 and the computer program code may be configured to, with the processor 820, cause the radio network node 20 to derive a random access preamble identifier, ID, from a random access preamble received from an unserved UE 10, and furthermore to include the random access preamble ID in a RAPID field of the RAPID subheader.

Also, in response to a determination that a previous overload condition no longer exists, the memory 830 and the computer program code may be configured to, with the processor 820, cause the radio network node 20 to identify the random access preamble ID included in the RAPID subheader for identifying the unserved UE 10, and transmit (via the transmitter 810) a MAC RAR to the unserved UE 10.

Figure 9:
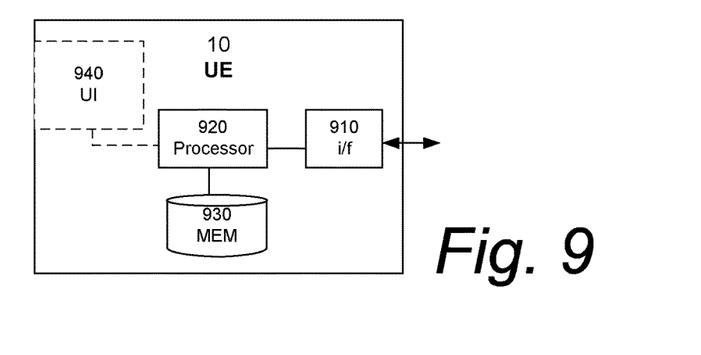
FIG. 9 shows an example embodiment of a user equipment (UE).

FIG. 9 illustrates a user equipment, UE 10. The UE 10 may be configured to perform earlier-described methods of this disclosure. In this example embodiment, the UE 10 comprises a communication interface 910, a processor 920, a memory 930 and optionally a user interface 940 through which a user can operate and interact with the UE 10. In this example embodiment, the communication interface 910 comprises a receiver and a transmitter. In alternative embodiments, the receiver and transmitter functionalities are combined into one single unit, a transceiver. The transmitter 910 is configured to transmit, to a radio network node 20, a random access preamble (e.g. on a PRACH channel). The receiver 910 is configured to receive a RAPID subheader (e.g. a E/T/RAPID subheader) and an accompanying request to extend a time during which the UE 10 waits for reception of a subsequent MAC RAR. The memory 930 is configured to store computer program code, which, when run in the processor 920 causes the UE 10 to, after reception of the above-mentioned request, start a timer and monitor a PDCCH channel for reception, via the receiver 910, of the MAC RAR message until the timer has reached a maximum time limit. This maximum time limit corresponds to the extended time period. Again, the MAC RAR may be transmitted on a Physical Downlink Shared Channel (PDSCH) indicated by a downlink resources assignment addresses to a Random Access RNTI (RA-RNTI) on the PDCCH.

In an advantageous embodiment, the receiver 910 is configured to receive the RAPID subheader without a corresponding MAC RAR. The memory 930 and the computer program code may be configured to, with the processor 920, cause the UE 10 to interpret a reception of the RAPID subheader without the corresponding MAC RAR to represent the earlier-mentioned request to extend a time during which the UE 10 shall wait for reception of a subsequent MAC RAR.

In another embodiment, the receiver 910 is configured to receive the RAPID subheader with a corresponding MAC RAR, which includes the request (for example included in a Reserved field 410 as described hereinabove). The memory 930 and the computer program code may thus be configured to, with the processor 920, cause the UE 10 to interpret a reception of the RAPID subheader with the corresponding modified MAC RAR (i.e. a MAC RAR including the request) to represent the request to extend a time during which the UE 10 shall wait for reception of a subsequent MAC RAR.

It should be appreciated that, in some embodiments, it may be advantageous if the radio network node 20 can prioritize which UE(s) that should be served and which UE(s) that should extend the time during which these UE(s) wait(s) for reception of a subsequent MAC RAR. As will be appreciated by those skilled in the art, the prioritization of which UE(s) to select may be performed in numerous ways. As a mere example, the prioritization may be made on the basis of estimated, or measured, radio channel quality. For example, those UE(s) with the best estimated channel quality may be prioritized over those UE(s) with comparatively worse channel quality. As an example basis for the channel quality estimation the radio network node 20 could use the signal strength or SINR (Signal to Interference plus Noise Ratio) with which the random access preamble was received and/or the propagation delay between the UE 10 and the radio network node 20 (wherein a longer propagation delay implies a potentially poorer channel quality). The propagation delay from a UE 10 may, e.g. be calculated from the timing of the reception of the preamble from the UE 10 within the reception window for random access preambles. Another example prioritization may be to simply arbitrarily prioritize among the UEs. Yet another example of prioritization may be based on the preamble group, i.e. Group A or Group B, that each received random access preamble may belong to. This may result in two different strategies, both with its own rationale: 1) prioritize for service (i.e. not to be requested to extend the time to wait for a MAC RAR) UE(s) transmitting random access preamble(s) from preamble group B; or 2) prioritize for service (i.e. not to be requested to extend the time to wait for a MAC RAR) UE(s) transmitting random access preamble(s) from preamble group A. The former strategy may be motivated by i) this/these UE(s) has/have more data to transmit in step three of the random access procedure, which may imply higher importance; and/or ii)) this/these UE(s) has/have good channel conditions which make(s) it/them resource efficient to serve. The latter strategy may be motivated in a situation where resources are scarce and comparatively more UEs may be served if they have little data to send (which at least may e.g. be the case for step three of the random access procedure for UEs transmitting random access preambles from preamble group A). The above are only examples of various ways of performing the prioritization. Other ways of performing the prioritization are of course also conceivable.

According to the various embodiments disclosed throughout this disclosure, it is proposed to accompany a request (to unserved UEs) in a MAC subheader (advantageously an E/T/RAPID subheader). This request is configured to request the unserved UE to extend the time period during which it waits for reception of a MAC RAR when it has been determined by the radio network node 20 that it does not have sufficient resources for responding to all UEs from which it has received random access preambles (i.e. an overload condition exists). This way, in situations where a radio network node 20 does not currently have sufficient resources, some UEs can be informed about this and be instructed (requested) to wait for a somewhat longer time until resources are again sufficient to serve the yet unserved UE(s). Some embodiments disclosed herein can therefore provide for an improved overload control mechanism, which is capable of reacting relatively quickly to changes in overload situations. Some embodiments disclosed herein may allow for UEs and radio network nodes to utilize their respective resources more efficiently. For example, once previously insufficient resources become available, these resources can be utilized more efficiently and/or more quickly. According to some embodiments, the UE's network access is not delayed unnecessarily much. Moreover, some embodiments described herein are advantageous because these may reduce, or minimize, the energy consumption of UEs (that would otherwise result from UEs re-attempting network access in overload situations). Some of the embodiments disclosed herein are particularly (though not exclusively) appealing with the introduction of MTC type communication in 3GPP-based communication networks. More specifically, the embodiments disclosed herein may be interesting in scenarios where many UEs and/or other devices try to access a communication network simultaneously, or substantially simultaneously. Also, it is an advantage with some embodiments that the radio network node 20 may individually identify those UEs for which the time during which the UE waits for reception of a MAC RAR should be extended. This can make the overload control increasingly efficient. Finally, some of the embodiments could be made backwards compatible.

In the detailed description hereinabove, for purposes of explanation and not limitation, specific details are set forth such as particular architectures, interfaces, techniques, etc. in order to provide a thorough understanding of various embodiments of the present invention. In some instances, detailed descriptions of well-known devices, circuits, and methods have been omitted so as not to obscure the description of the embodiments disclosed herein with unnecessary detail. All statements herein reciting principles, aspects, and embodiments disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. Thus, for example, it will be appreciated by those skilled in the art that block diagrams herein can represent conceptual views of illustrative circuitry or other functional units embodying the principles of the embodiments. Similarly, it will be appreciated that any flow charts and the like represent various processes which may be substantially represented in computer readable medium and so executed by a computer or processor, whether or not such computer or processor is explicitly shown. The functions of the various elements, including functional blocks, may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented. In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions. In terms of computer implementation, a computer is generally understood to comprise one or more processors or one or more controllers. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

Although the present invention has been described above with reference to specific embodiments, it is not intended to be limited to the specific form set forth herein. Rather, the invention is limited only by the accompanying claims and other embodiments than the specific above are equally possible within the scope of the appended claims. As used herein, the terms "comprise/comprises" or "include/includes" do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality. Finally, reference signs in the claims are provided merely as a clarifying example and should not be construed as limiting the scope of the claims in any way.

The invention claimed is:

1. A method performed by a radio network node for overload control in a communication network, the method comprising:
   receiving a random access preamble from a user equipment (UE);
   deriving a random access preamble identifier (ID) from the random access preamble received from the UE;
   determining whether an overload condition exists in response to receiving the random access preamble from the UE; and
   in response to determining that the overload condition exists:
      configuring a Medium Access Control (MAC) Protocol Data Unit (PDU) to accompany a Random Access Preamble Identifier (RAPID) subheader without a corresponding MAC Random Access Response (RAR);
      including the random access preamble ID of the UE in a RAPID field of the RAPID subheader, wherein the RAPID subheader without the corresponding MAC RAR is placed at an end of a list of RAPID subheaders; and transmitting the RAPID subheader without the corresponding MAC RAR, wherein a combination of the RAPID subheader without the corresponding MAC RAR represents a request for the UE identified by the random access preamble ID to wait for reception of a subsequent MAC RAR.

2. The method according to claim 1, wherein the RAPID subheader is a E/T/RAPID subheader.

3. The method according to claim 1, wherein receiving the random access preamble comprises receiving the random access preamble on a Physical Random Access Channel, PRACH.

4. The method according to claim 1, further comprising, in response to determining that the overload condition no longer exists:
identifying the random access preamble ID included in the RAPID subheader for identifying the UE; and
transmitting, to the UE identified by said random access preamble ID, a MAC RAR corresponding to said RAPID subheader.

5. A method performed by a user equipment (UE) the method comprising:
transmitting a random access preamble to a radio network node;
in response to transmitting the random access preamble, receiving a Random Access Preamble Identifier (RAPID) subheader without a corresponding Medium Access Control (MAC) Random Access Response (RAR), the RAPID subheader without the corresponding MAC RAR being located at an end of a list of RAPID subheaders, wherein the RAPID subheader comprises a random access preamble identifier (ID) of the UE in a RAPID field of the RAPID subheader;
wherein a combination of the RAPID subheader without the corresponding MAC RAR represents a request to extend a time period that the specific UE identified by the random access preamble ID waits for reception of a subsequent MAC RAR from the radio network node; and
in response to receiving the RAPID subheader without the corresponding MAC RAR:
starting a timer; and
monitoring a Physical Downlink Control Channel (PDCCH) for reception of the subsequent MAC RAR at least until the timer has reached the time period.

6. The method according to claim 5, wherein the RAPID subheader is a E/T/RAPID subheader.

7. A radio network node comprising:
a receiver configured to receive a random access preamble from a user equipment, UE;
a transmitter;
a processor communicatively coupled to the transmitter and the receiver, the processor configured to derive a random access preamble identifier (ID) from the random access preamble received from the UE; and
a memory communicatively coupled to the processor, the memory storing computer program code, which, when run in the processor causes the radio network node to:
determine, via the processor, whether an overload condition exists; and in response to determining that the overload condition exists,
configure, via the processor, a Medium Access Control (MAC) Protocol Data Unit (PDU) to accompany a Random Access Preamble Identifier (RAPID) subheader without a corresponding MAC Random Access Response (RAR), where the RAPID subheader includes the random access preamble ID in a RAPID field of the RAPID subheader, and wherein the RAPID subheader without the corresponding MAC RAR is placed at an end of a list of RAPID subheaders; and
transmit, via the transmitter, the RAPID subheader without a corresponding MAC RAR, wherein a combination of the RAPID subheader without the corresponding MAC RAR represents a request for the UE identified by the random access preamble ID to wait for reception of a subsequent MAC RAR.

8. The radio network node according to claim 7, wherein the RAPID subheader is a E/T/RAPID subheader.

9. The radio network node according to claim 7, wherein the receiver is configured to receive the random access preamble comprises receiving the random access preamble on a Physical Random Access Channel, PRACH.

10. The radio network node according to claim 7, wherein in response to a determination that the overload condition no longer exists, the memory and the computer program code are configured to, with the processor, cause the radio network node to identify the random access preamble ID included in the RAPID subheader for identifying the UE; and transmit, via the transmitter, to the UE identified by said random access preamble ID, a MAC RAR corresponding to said RAPID subheader.

11. A user equipment, UE, comprising:
a transmitter configured to transmit, to a radio network node, a random access preamble;
a receiver configured to receive a Random Access Preamble Identifier (RAPID) subheader without a corresponding Medium Access Control (MAC) Random Access Response (RAR), the RAPID subheader without the corresponding MAC RAR being located at an end of a list of RAPID subheaders, wherein the RAPID subheader comprises a random access preamble identifier (ID) of the UE in a RAPID field of the RAPID subheader;
wherein a combination of the RAPID subheader without the corresponding MAC RAR represents a request to extend a time period that UE waits for reception of a subsequent MAC RAR from the radio network node;
a processor communicatively coupled to the receiver and the transmitter; and
a memory communicatively coupled to the processor, the memory storing computer program code, which, when run in the processor causes the UE identified by the random access preamble ID to, in response to a reception of said request:
start a timer; and
monitor a Physical Downlink Control Channel (PDCCH) for reception, via the receiver, of the subsequent MAC RAR at least until the timer has reached the time period.

12. The UE according to claim 11, wherein the RAPID subheader is a E/T/RAPID subheader.

* * * * *